United States Patent [19]

Furuta et al.

[11] Patent Number: 4,494,445
[45] Date of Patent: Jan. 22, 1985

[54] TANDEM-TYPE BRAKE BOOSTER

[75] Inventors: Yohichi Furuta, Chiryu; Kaoru Tsubouchi; Michiharu Nishii, both of Toyota, all of Japan

[73] Assignee: Aisin Seiki Kabushiki Kaisha, Kariya, Japan

[21] Appl. No.: 554,679

[22] Filed: Nov. 23, 1983

[30] Foreign Application Priority Data

Dec. 3, 1982 [JP] Japan .................. 57-183948[U]

[51] Int. Cl.³ .................. F15B 9/10; F01B 19/00
[52] U.S. Cl. .................. 91/369 A; 91/376 R; 92/49; 92/169
[58] Field of Search .................. 60/547.1, 593; 91/369 R, 369 A, 369 B, 519, 376 R; 92/48, 49, 64, 169.2

[56] References Cited

U.S. PATENT DOCUMENTS

| 2,989,035 | 6/1961 | Stelzer | 91/376 |
|---|---|---|---|
| 3,388,635 | 6/1968 | Hager | 92/48 |
| 3,420,145 | 1/1969 | Stumpe | 91/376 |
| 3,958,497 | 5/1976 | Gardner et al. | 92/48 |
| 4,069,742 | 1/1978 | Gephart et al. | 92/49 |

FOREIGN PATENT DOCUMENTS

| 1812699 | 12/1968 | Fed. Rep. of Germany | 92/48 |
|---|---|---|---|
| 1254718 | 1/1961 | France | 91/369 B |

Primary Examiner—Paul E. Maslousky
Attorney, Agent, or Firm—Oblon, Fisher, Spivak, McClelland & Maier

[57] ABSTRACT

A tandem-type brake booster including a closed shell assembly composed of front and rear chambers defined by a partition member therein and power pistons coaxially disposed in the front and rear chambers, respectively, the power pistons being operatively coupled with each other and passing through a substantially central portion of the partition member, each of the front and rear chambers being divided into a constant-pressure chamber subjected to a vacuum and a variable-pressure chamber communicable selectively with the constant-pressure chamber and atmosphere, the constant-pressure chambers in the front and rear chambers being held in communication with each other, the variable-pressure chambers in the front and rear chambers being held in communication with each other, the power pistons being axially movable in unison by pressure differences between the constant-pressure chambers and the variable-pressure chambers, respectively, one of the front and rear chambers having an outside diameter smaller than that of the other chamber and that of the power piston disposed in the other chamber, and the power piston in the other chamber having an outer peripheral portion overlapping an outer peripheral portion of the one chamber when the power pistons are moved forward.

6 Claims, 4 Drawing Figures

TANDEM-TYPE BRAKE BOOSTER

BACKGROUND OF THE INVENTION

1. Field of the Invention

The present invention relates to a tandem-type brake booster for assisting a brake in braking operation.

2. Description of the Prior Art

Brake boosters are required to assist the brake of an automobile in producing sufficiently large braking forces and to improve the "feeling" which the driver has on braking the automobile. To meet such requirements, attempts have heretofore been made to increase the volume of a closed shell or casing of the brake boosters. One effort has been directed to increasing of the diameter of the closed shell. According to another improvement, as schematically shown in FIG. 2(b) of the accompanying drawings, a closed shell or casing 10b is divided into front and rear chambers R, R having the same outside diameter, and power piston 20b, 30b are disposed respectively in the front and rear chambers R, R to provide a tandem construction having a pair of axially arranged constant- and variable-pressure chambers. The former proposal is disadvantageous in that the brake booster is radially increased in dimension. With the latter arrangement, the brake booster has an increased axial length. These prior brake booster constructions therefore fail to meet a present demand for smaller-size brake boosters.

SUMMARY OF THE INVENTION

It is an object of the present invention to provide a tandem-type brake booster of a smaller size having a smaller axial length for a reduced closed shell volume for providing the same brake assisting forces as those of conventional brake boosters.

A tandem-type brake booster includes a closed shell assembly composed of front and rear chambers defined by a partition member therein and power pistons coaxially disposed in the front and rear chambers, respectively, the power pistons being operatively coupled with each other and passing through a substantially central portion of the partition member, each of the front and rear chambers being divided into a constant-pressure chamber subjected to a vacuum and a variable-pressure chamber communicable selectively with the constant-pressure chamber and atmosphere, the constant-pressure chambers in the front and rear chambers being held in communication with each other, the variable-pressure chambers in the front and rear chambers being held in communication with each other, the power pistons being axially movable in unison by pressure differences between the constant-pressure chambers and the variable-pressure chambers, respectively. According to the present invention, one of the front and rear chambers has an outside diameter smaller than that of the other chamber and that of the power piston disposed in the other chamber, and the power piston in the other chamber has an outer peripheral portion overlapping an outer peripheral portion of the one chamber when the power pistons are moved forward or return to inoperative positions thereof. To provide the same brake assisting force as that generated by a conventional brake booster, the brake booster of the invention may be of a volume smaller than that of the prior brake booster by a volume equal to the product of a cross-sectional area (more precisely, a cross-sectional area effective for generating a brake assisting force) of a smaller-diameter chamber in the closed shell assembly and an axial length by which an outer pheripheral portion of the power piston in a larger-diameter chamber overlaps an outer peripheral portion of the smaller-diameter chamber. Therefore, the size of the brake booster of the invention may be smaller than that of the prior brake booster by the reduced volume. Stated otherwise, the brake booster having a closed shell assembly of the same volume as that of the conventional brake booster is capable of producing an increased brake assisting force larger than that generated by the prior brake booster by the amount corresponding to the reduced volume.

The volume and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
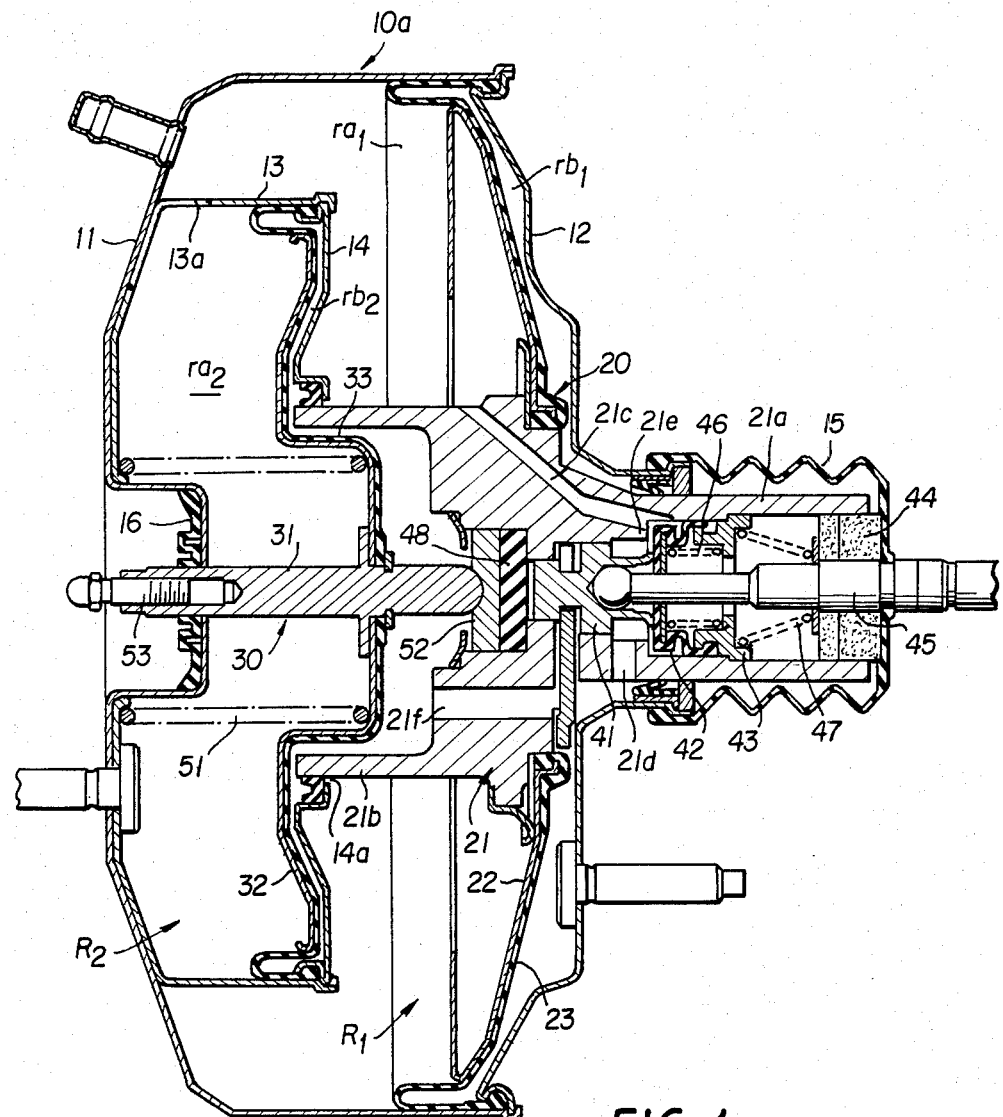
FIG. 1 is an axial cross-sectional view of a tandem-type brake booster according to the present invention.

As shown in FIG. 1, a tandem-type brake booster comprises a closed shell or casing assembly 10a composed of front and rear shells 11, 12 defining therein front and rear chambers $R_2$, $R_2$ respectively with a tubular reinforcement member 13 reinforcing the front shell 11 and an annular partition 14 covering a rear opening in the reinforcement member 13. First and second power pistons 20, 30 serving as main components of the brake booster are disposed respectively in the chambers $R_1$, $R_2$.

The first power piston 20 disposed in the rear chamber 81 is composed of a piston body 21 and a diaphragm 23 fixedly mounted together with a retainer 22 on a neck of the piston body 21. The piston body 21 has a rear tube 21a supported axially movably in the rear shell 12 in an airtight manner. The piston body 21 also has a front tube 21b supported axially movably in an opening 14a in the partition 14 in an airtight manner. The diaphragm 23 has an outer peripheral edge clamped by a joint between the front and rear shells 11, 12. There are defined a first constant-pressure chamber $ra_1$ in a front portion of the rear chamber $R_1$ and a first variable-pressure chamber $rb_1$ in a rear portion of the rear chamber $R_1$. The first constant-pressure chamber $ra_1$ is connected to a vacuum source (not shown) such as an engine intake manifold to develop a vacuum in the chamber $ra_1$.

A valve plunger 41 is fited in the rear tube 21a of the piston body 21 for axial sliding movement for a predetermined length. A retainer 43 is also fitted securely in the rear tube 21a for holding a tubular valve body 42. The valve plunger 41 is connected to a push rod 44 inserted in a dust boot 15 and an air filter 45 which cover the outer periphery and rear end of the rear tube 21a of the piston body 21. The tubular valve body 42 is normally urged by a small-diameter coil spring 46 to move forward to cause a front end of the valve body 42 to abut against the rear end of the valve plunger 41. The push rod 45 is normally biased to move rearward by means of a medium-diameter coil spring 47. The push rod 45 is moved forward in response to depression of a brake pedal (not shown). When the push rod 45 is thus moved, the valve plunger 41 is subjected to reactive forces from a reaction disk 48 of rubber fitted in the front tube 21b of the piston body 21.

When the push rod 45 is inoperative, passageways 21c, 21d defined in the piston body 21 are held in communication with each other to provide communication between the first constant- and variable-pressure chambers ra₁, rb₁ and shut the first variable-pressure chamber rb₁ off from the atmosphere. Thus, the chambers ra₁, rb₁ are subjected to the same vacuum therein. When the push rod 45 is moved forward, the valve plunger 41 is also moved forward therewith. At the same time, the tubular valve body 42 is extended under the bias of the small-diameter coil spring 46 until it is seated on a valve seat 21e of the piston body 21 to bring the chambers ra₁, rb₁ out of mutual communication. When the push rod 45 is further moved forward, the rear end of the valve plunger 41 is disengaged from the front end of the tubular valve body 42 to allow the first variable-pressure chamber rb₁ to communicated with atmosphere through the passageway 21d in the piston body 21 and the air filter 44. As a result, the first power piston 20 is moved forward under a pressure difference which is now generated between the chambers ra₁, rb₁.

The front chamber R₂ has a diameter smaller than that of the rear chamber R₁, and the second power piston 30 disposed in the front chamber R₂ has a diameter smaller than that of the first power piston 20. The second power piston 30 comprises a rod-shaped piston body 31 and a diaphragm 33 fixed together with a retainer 32 to an outer peripheral surface of the piston body 31. The piston body 31 has a front portion supported axially movably in an airtight manner in a seal member 16 fixedly mounted in a central opening in the front shell 11. The diaphragm 33 has an outer peripheral edge gripped by a joint between the reinforcement member 13 and the partition 14, thus defining a second constant-pressure chamber ra₂ in a front portion of the front chamber R₂ and a second variable-pressure chamber rb₂ in a rear portion of the front chamber R₂. The second power piston 30 is normally urged by a large-diameter coil spring 51 disposed in the second constant-pressure chamber ra₂ to move rearward to cause the rear end of the piston body 31 to abut against a retainer 52 slidably fitted in the front tube 21b of the piston body 21 of the first power piston 20. The first power piston 20 is biased by the large-diameter coil spring 51 to move back into the inoperative position (as shown). The second constant-pressure chamber ra₂ in the front chamber R₂ is held in communication with the first constant-pressure chamber ra₁ through an opening 13a defined in an outer peripheral portion of the reinforcement member 13. The second variable-pressure chamber rb₂ is held in communication with the first variable-pressure chamber rb₁ through a hole 21f defined in the piston body 21 of the first power piston 20.

The second power piston 30 and the first power piston 20 are coaxially disposed and operatively coupled with each other. When a pressure difference is created between the first constant- and variable- pressure chambers ra₁, rb₁ in the rear chamber R₂ due to operation of the push rod 45, the same pressure difference is simultaneously produced between the second constant- and variable-pressure chambers ra₂, rb₂ in the front chamber R₂, causing the second and first power pistons 30, 20 to move forward in unison. During the forward movement of the power pistons 20, 30, the first power piston 20 is moved until the outer peripheral portion of the retainer 22 overlaps a rear outer peripheral portion of the front chamber R₂. Therefore, when the push rod 45 is moved forward in response to depression of the brake pedal (not shown), the power pistons 20, 30 are moved forward in unison for a predetermined distance to enable an operation rod 53 threaded in the front end of the piston body 31 to slide the piston in a master cylinder (not shown). The master cylinder then generates a high hydraulic pressure therein which is then applied to wheel cylinders (not shown) to brake the automobile.

Figure 2A:
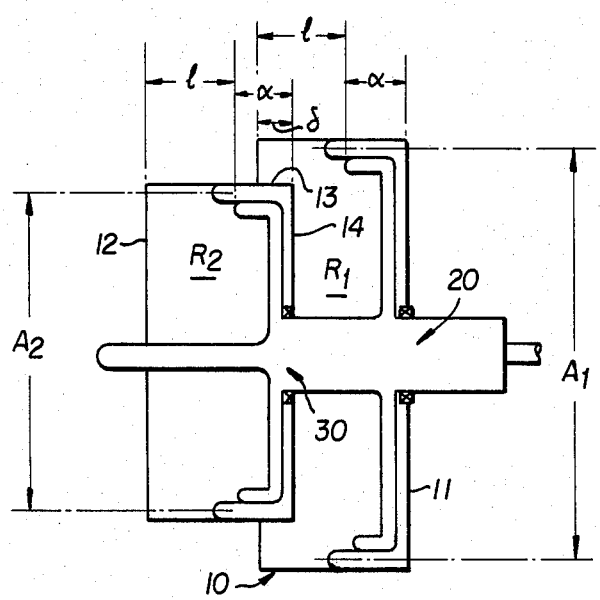
FIG. 2(a) is a schematic diagram of the brake booster shown in FIG. 1.
Figure 2B:
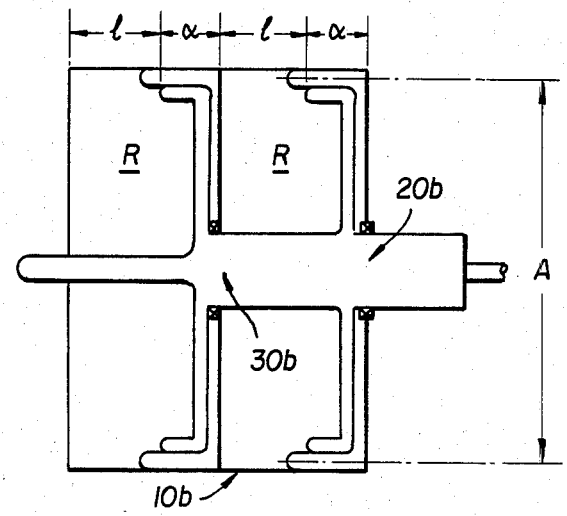
FIG. 2(b) is a schematic diagram of a conventional brake booster.

FIGS. 2(a) and 2(b) schematically illustrate the brake booster of the invention and a conventional brake booster, respectively, to aid in calculating the volumes Va, Vb of closed shells 10, 10b and brake assisting forces Qa, Qb produced by the brake boosters. Designated in FIGS. 2(a) and 2(b) at A is an effective cross-sectional area of the chambers R in the conventional brake booster, A₁ an effective cross-sectional area of the rear chamber R₁ in the brake booster of the invention, and A₂ an effective cross-sectional area of the front chamber R₂ in the brake booster of the invention. Also designated at α is axial lengths of the front and rear chambers for sealing the brake boosters, and l intervals of movement of the power pistons 20, 30, 20b, 30b. The dimensions α, l are substantially the same in these brake boosters. Furthermore, δ designates an axial length by which the outer pheripheral portion of the first power piston 20 of the invention overlaps the outer peripheral portion of the front chamber R₂ when the first power piston 20 is moved forward the maximum distance.

The volume Vb of the closed shell 10b of the conventional brake booster and the volume Va of the closed shell 10 of the brake booster of the invention are calculated as follows:

$$Va = (l+\alpha) \cdot A_1 + (l+\alpha-\delta) \cdot A_2$$

$$Vb = 2 \cdot (l+\alpha) \cdot A$$

Assuming the maximum pressure difference between the constant- and variable-pressure chambers in expressed by p, the brake assisting forces Qa, Qb by the brake booster of the invention and the conventional brake booster are calculated as follows:

$$Qa = (A_1 + A_2) \cdot p$$
$$Qb = 2 \cdot A \cdot p$$

To gain the same brake assisting forces from both the brake boosters, Qa=Qb and hence $2 \cdot A = A_1 + A_2$, and from this results:

$$Vb - Va = (l + \alpha) \cdot (A_1 + A_2) - \{(l + \alpha) \cdot A_1 + (l + \alpha - \delta) \cdot A_2\} = A_2 \cdot \delta$$

It is apparent from this equation that to obtain the same brake assisting force, the volume of the closed shell of the brake booster of the present invention may be smaller than that of the closed shell of the prior art brake booster by $A_2\delta$, and the axial length of the brake booster of the invention may be smaller by δ than that of the conventional brake booster. Accordingly, the brake booster can be smaller in size. Stated otherwise, with the volumes of the brake boosters of the invention and prior art being equal, the brake booster of the invention can produce a greater brake assisting force than the prior brake booster.

The brake booster of the invention is also advantageous in that the front chamber $R_2$ has a smaller outside diameter than that of the rear chamber $R_1$, and the opening 13a is simply defined in the outer peripheral surface of the reinforcement member 13 which defines the front chamber $R_2$ for providing communication between the second constant-pressure chamber $ra_2$ in the front chamber $R_2$ and the first constant-pressure chamber $ra_1$ in the rear chamber $R_1$.

Since the reinforcement member 13 in the front shell 11 is tubular and cooperates with the partition 14 in defining the front chamber $R_2$, the reinforcement member 13 can double effectively as both a reinforcement member and a member defining the front chamber.

The brake booster as described above is by way of example only, and the present invention is applicable to tandem-type brake boosters of various designs. For example, the present invention can be incorporated in a tandem-type brake booster schematically shown in FIG. 3.

Figure 3:
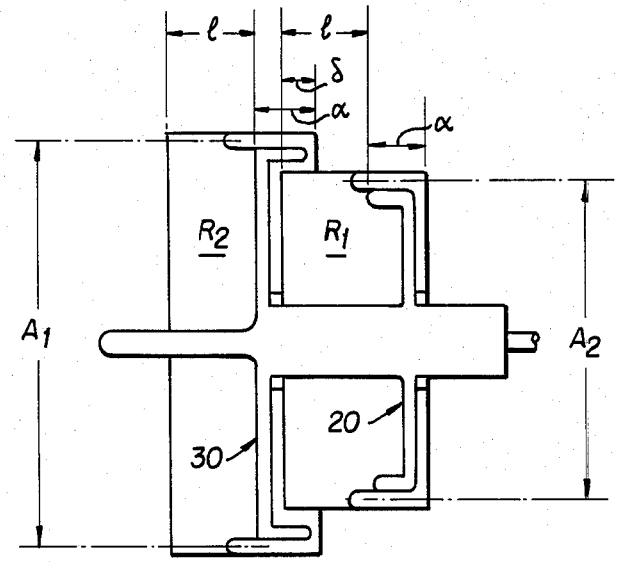
FIG. 3 is a schematic diagram of a brake booster according to another embodiment of the present invention.

As illustrated in FIG. 3, a rear chamber R1 has an outside diameter smaller than that of a front chamber $R_2$ and that of a power piston 30 disposed in the front chamber $R_2$. When the power pistons 20, 30 are moved back to the illustrated position, the power piston 30 in the front chamber $R_2$ has an outer peripheral portion overlapping an outer peripheral portion of the rear chamber $R_1$. The other construction is the same as that of the brake booster shown in FIG. 2(a). The brake booster of FIG. 3 has a volume smaller by A2 δ and an axial length smaller by than those of conventional brake boosters, and hence is smaller in size.

Although certain preferred embodiments have been shown and described, it should be understood that many changes and modifications may be made therein without departing from the scope of the appended claims.

What is claimed is:

1. A tandem-type brake booster comprising a closed shell assembly composed of front and rear chambers defined by a partition member therein and first and second power pistons coaxially disposed in said front and rear chambers, respectively, said power pistons being operatively coupled with each other and passing through a substantially central portion of said partition member, each of said front and rear chambers including a constant-pressure chamber subjected to a vacuum and a variable-pressure chamber, respectively, and means for selectively communicating said variable pressure chamber of said rear chamber with said constant pressure chambers and atmosphere, said constant-pressure chambers in said front and rear chambers being held in communication with each other, said variable-pressure chambers in said front and rear chambers being in communication with each other, said power pistons being axially movable in unison by pressure differences between said constant-pressure chambers and said variable-pressure chambers, respectively, one of said front and rear chambers having an outside diameter smaller than that of the other chamber and that of the power piston disposed in said other chamber, and the power piston in said other chamber having an outer peripheral portion overlapping an outer peripheral portion of said one chamber when said power piston are moved forward or returned to inoperative positions thereof wherein said closed shell assembly further comprises a cup-shaped front shell having an open rear end and a rear shell coupled to said open rear end of said front shell, and wherein said partition member further comprises a cup-shaped reinforcement member having a diameter smaller than that of said front shell and reinforcing said front shell and a partition closing a rear opening in said reinforcement member.

2. A tandem-type brake booster according to claim 1, wherein said front chamber has an outside diameter smaller than that of said rear chamber and that of the power piston disposed in said rear chamber, the outer peripheral portion of said power piston in said rear chamber being movable into surrounding relation to the outer peripheral portion of said front chamber when said power pistons are moved forward.

3. A tandem-type brake booster according to claim 1, or 2 wherein said power piston in said rear chamber includes a central piston body having a tubular portion projecting into a rear portion of said closed shell assembly, and wherein said means further comprises a driver-operated valve mechanism disposed in said tubular portion for bringing said variable-pressure chambers into selective communication with said constant-pressure chamber and atmosphere.

4. A tandem-type brake booster according to claim 1, wherein said constant-pressure chambers further comprise a first constant-pressure chamber connected to a vacuum source and a second constant-pressure chamber communicated with said first constant-pressure chamber through an opening defined in an outer peripheral portion of said reinforcement member.

5. A tandem-type brake booster according to claim 2, wherein said constant-pressure chambers further comprise a first constant-pressure chamber connected to a vacuum source and a second constant-pressure chamber communicated with said first constant-pressure chamber through an opening defined in an outer peripheral portion of said reinforcement member.

6. A tandem-type brake booster according to claim 3, wherein said drive-operated valve mechanism further comprises a plunger connected to a push rod and a rubber reaction disk fitted within said piston body for applying a reactive force to said plunger.

* * * * *